(12) United States Patent
Higashikawa et al.

(10) Patent No.: US 10,737,466 B2
(45) Date of Patent: Aug. 11, 2020

(54) MULTILAYER FILM AND MULTILAYER MOLDED ARTICLE

(71) Applicant: Mitsubishi Chemical Corporation, Tokyo (JP)

(72) Inventors: Megumi Higashikawa, Tokyo (JP); Yuuji Kawaguchi, Tokyo (JP); Kazuya Ooaira, Tokyo (JP); Junichi Abe, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 205 days.

(21) Appl. No.: 15/758,569

(22) PCT Filed: Sep. 6, 2016

(86) PCT No.: PCT/JP2016/076105
§ 371 (c)(1),
(2) Date: Mar. 8, 2018

(87) PCT Pub. No.: WO2017/043467
PCT Pub. Date: Mar. 16, 2017

(65) Prior Publication Data
US 2018/0244019 A1 Aug. 30, 2018

(30) Foreign Application Priority Data
Sep. 11, 2015 (JP) ................. 2015-179186

(51) Int. Cl.
| | | |
|---|---|---|
| *B32B 27/08* | (2006.01) | |
| *B32B 15/082* | (2006.01) | |
| *B32B 25/14* | (2006.01) | |
| *B32B 27/30* | (2006.01) | |
| *C08F 265/06* | (2006.01) | |
| *B32B 25/08* | (2006.01) | |
| *B32B 7/12* | (2006.01) | |

(52) U.S. Cl.
CPC .............. *B32B 15/082* (2013.01); *B32B 7/12* (2013.01); *B32B 25/08* (2013.01); *B32B 25/14* (2013.01); *B32B 27/08* (2013.01); *B32B 27/304* (2013.01); *B32B 27/308* (2013.01); *C08F 265/06* (2013.01); *B32B 2250/02* (2013.01); *B32B 2250/03* (2013.01); *B32B 2250/40* (2013.01); *B32B 2270/00* (2013.01); *B32B 2307/412* (2013.01); *B32B 2307/712* (2013.01); *B32B 2307/714* (2013.01); *B32B 2419/06* (2013.01); *B32B 2451/00* (2013.01); *B32B 2457/00* (2013.01); *B32B 2551/00* (2013.01); *B32B 2590/00* (2013.01); *B32B 2605/00* (2013.01); *B32B 2607/00* (2013.01)

(58) Field of Classification Search
CPC .............. B32B 15/082; B32B 2250/02; B32B 2250/03; B32B 2250/40; B32B 2270/00; B32B 2307/412; B32B 2307/712; B32B 2307/714; B32B 2419/06; B32B 2451/00; B32B 2457/00; B32B 2551/00; B32B 2590/00; B32B 25/08; B32B 25/14; B32B 2605/00; B32B 2607/00; B32B 27/08; B32B 27/304; B32B 27/308; B32B 7/12; C08F 265/06

See application file for complete search history.

(56) References Cited

U.S. PATENT DOCUMENTS

| | | |
|---|---|---|
| 2006/0110592 A1 | 5/2006 | Doi et al. |
| 2011/0124816 A1 | 5/2011 | Morita et al. |
| 2014/0342162 A1 | 11/2014 | Sanefuji et al. |

FOREIGN PATENT DOCUMENTS

| | | |
|---|---|---|
| CN | 103930275 A | 7/2014 |
| EP | 2530118 A1 | 12/2012 |
| JP | H11-071437 A | 3/1999 |
| JP | 2003-236998 A | 8/2003 |
| JP | 2004-137298 A | 5/2004 |
| JP | 2004-204188 A | 7/2004 |
| JP | 2004-331866 A | 11/2004 |
| JP | 2012-187934 A | 10/2012 |
| KR | 10-2014-0060355 A | 5/2014 |
| WO | 2013/039119 A1 | 3/2013 |

OTHER PUBLICATIONS

Office Action issued in corresponding Japanese Patent Application No. 2016-561026 dated Mar. 6, 2018.
Office Action issued in related Korean Patent Application No. 10-2018-7004928 dated May 14, 2019.
Office Action issued in related Chinese Patent Application No. 201680052127.5 dated Jun. 5, 2019.
(Continued)

*Primary Examiner* — Lawrence D Ferguson
(74) *Attorney, Agent, or Firm* — Morgan, Lewis & Bockius LLP

(57) ABSTRACT

As a laminated film having high transparency, stress whitening resistance, and chemical resistance, a laminated film comprising a layer comprising a fluorine-based resin (X) and a layer comprising an acrylic resin composition (Y), and satisfying the following conditions (1) and (2) is provided. (1) When a test piece is stretched from a chuck-to-chuck distance of 25 mm to 35 mm at a temperature of 0° C. and a tensile rate of 500 mm/min according to ISO 527-3, a difference (ΔW) between a degree of whiteness of the test piece before and that after stretching is 5 or less. (2) The acrylic resin composition (Y) comprises a rubber-containing polymer (B) comprising 30% by mass or more of an elastic polymer (B1).

19 Claims, No Drawings

(56) References Cited

OTHER PUBLICATIONS

Office Action issued in related Korean Patent Application No. 10-2018-7004928 dated Oct. 16, 2019.
International Search Report issued in corresponding International Patent Application No. PCT/JP2016/076105 dated Oct. 25, 2016.
Extended European Search Report issued in corresponding European Patent Application No. 16844328.1 dated Sep. 5, 2018.
Office Action issued in corresponding Chinese Patent Application No. 201680052127.5 dated Dec. 16, 2019.
Office Action issued in corresponding Korean Patent Application No. 10-2018-7004928 dated Jan. 3, 2020.
Office Action issued in corresponding Chinese Patent Application No. 201680052127.5 dated May 21, 2020.

MULTILAYER FILM AND MULTILAYER MOLDED ARTICLE

TECHNICAL FIELD

The present invention relates to a laminated film having high transparency, stress whitening resistance, and chemical resistance, and a laminated molded article using the film.

BACKGROUND ART

Molded bodies made of acrylic resins are excellent in transparency and have beautiful appearance and weather resistance and therefore are widely used for the purpose of design property provision for electrical components, vehicle components, optical components, ornaments, signboards, and the like. Particularly an acrylic resin molded body comprising an acrylic resin composition containing a rubber-containing polymer has high molding processability, and its utility value is high. But, an acrylic resin molded body generally has insufficient chemical resistance, and therefore in recent years, the demand for a laminated molded body in which a vinylidene fluoride-based resin is laminated on the outermost surface of an acrylic resin molded body to provide chemical resistance to the molded body has increased.

The above acrylic resin molded body is often used by being bonded to a substrate. As the method, mainly, the acrylic resin molded body is placed on a substrate and subjected to hot pressing to make a decorative sheet, and the decorative sheet is subjected to bending processing into a shape suitable for a use.

But, in conventional laminated molded articles, whitening (stress whitening), cracking, and peeling occur in the films in this bending processing, and therefore the molding processability is poor. As used herein, "stress whitening" refers to a phenomenon in which when a decorative sheet or the like is bonded to a substrate, and this substrate is subjected to bending processing in order to form the substrate into the shapes of various members such as a window frame, the fulcrum portion changes to white.

Patent Literature 1 provides a transparent laminated film having both excellent chemical resistance and surface hardness and further having a small haze value by laminating a layer of a polymer blend of a vinylidene fluoride-based resin and an acrylic resin on an acrylic resin layer, and a laminated molded body. However, in the laminated film of Patent Literature 1, the glass transition temperature of the acrylic resin composition of the base layer is high, and therefore adaptation to members that require bending processing in a low temperature environment is difficult.

Patent Literature 2 provides an acrylic resin film excellent in bending whitening resistance by increasing the amount of a crosslinking agent in an acrylic resin and setting the particle diameter in a particular range. However, in the acrylic resin film of Patent Literature 2, by blending with an MMA-EA copolymer and forming a film, the amount of rubber in the whole decreases, and the impact resistance of the film decreases. In addition, the glass transition temperature of the acrylic resin composition is high, and therefore adaptation to members that require bending processing in a low temperature environment is difficult.

CITATION LIST

Patent Literature

Patent Literature 1: International Publication No. WO 2013/039119
Patent Literature 2: Japanese Patent Laid-Open No. 2004-137298

SUMMARY OF INVENTION

Technical Problem

It is an object of the present invention to provide a laminated film having high transparency, stress whitening resistance, and chemical resistance. Particularly, it is an object of the present invention to provide a laminated film that does not cause problems such as stress whitening and cracking even when bonded to a substrate and subjected to bending processing under any temperature condition, and can provide high design properties due to sufficient transparency, and a laminated molded article using the laminated film.

Solution to Problem

Specifically, the present invention has the following features:

[1] A laminated film comprising a layer comprising a fluorine-based resin (X) and a layer comprising an acrylic resin composition (Y), and satisfying the following conditions (1) and (2);
  (1) when a test piece is stretched from a chuck-to-chuck distance of 25 mm to 35 mm at a temperature of 0° C. and a tensile rate of 500 mm/min according to ISO 527-3, a difference ($\Delta W$) between a degree of whiteness of the test piece before and that after stretching is 5 or less,
  (2) the acrylic resin composition (Y) comprises a rubber-containing polymer (B) comprising 30% by mass or more of an elastic polymer (B1).
[2] The laminated film of [1], wherein the fluorine-based resin (X) is a vinylidene fluoride-based resin (F).
[3] The laminated film of [1], wherein the layer comprising the fluorine-based resin (X) comprises a polymer blend of a vinylidene fluoride-based resin (F) and an acrylic resin (A).
[4] The laminated film of [1] or [2], wherein the layer comprising the acrylic resin composition (Y) comprises 80% by mass or more of the rubber-containing polymer (B).
[5] The laminated film of [3], wherein a glass transition temperature of the acrylic resin (A) is 95 to 120° C., and a vinylidene fluoride-based resin (F)/acrylic resin (A) content ratio is 50/50 to 95/5 (mass ratio).
[6] The laminated film of any of [1] to [5], wherein the rubber-containing polymer (B) is obtained by polymerizing a monomer (b) comprising an alkyl methacrylate (b1) having an alkyl group having 1 to 4 carbon atoms in the presence of the elastic polymer (B1) obtained by polymerizing a monomer (a) comprising one or more monomers selected from an alkyl acrylate (a1) having an alkyl group having 1 to 8 carbon atoms and an alkyl methacrylate (a2) having an alkyl group having 1 to 4 carbon atoms, and a crosslinkable monomer (a4).
[7] The laminated film of any of [1] to [6], wherein the rubber-containing polymer (B) is a graft polymer, and a content of a graft crossing agent unit in 100% by mass of the elastic polymer (B1) is 1.2% by mass or more.

[8] The laminated film of [6], wherein a total content of an alkyl acrylate (a1) monomer unit and an alkyl methacrylate (a2) monomer unit in the elastic polymer (B1) is 80% by mass or more.

[9] The laminated film according to [6] or [8], wherein an alkyl acrylate (a1) monomer unit/alkyl methacrylate (a2) monomer unit content ratio of the elastic polymer (B1) is 50/50 to 100/0 (mass ratio).

[10] The laminated film of [6], [8], or [9], wherein the elastic polymer (B1) comprises another vinyl monomer (a3) unit, and
a content of the monomer (a3) unit in the elastic polymer (B1) is 12% by mass or less.

[11] The laminated film of [6], [8], [9], or [10], wherein a content of an alkyl methacrylate (b1) monomer in the monomer (b) is 70% by mass or more.

[12] The laminated film of any of [8] to [11], wherein the rubber-containing polymer (B) is a graft polymer, and a content of a graft crossing agent unit in 100% by mass of the elastic polymer (B1) is 1.2% by mass or more.

[13] The laminated film of [1] to [12], having a total light transmittance of 90% or more.

[14] The laminated film of any of [1] to [13], wherein a thickness ratio of the layer comprising the fluorine-based resin (X) to the layer comprising the acrylic resin composition (Y) is 5/95 to 50/50.

[15] A laminated molded article wherein the laminated film of any of [1] to [14] is laminated on a substrate.

[16] A laminated molded article wherein the laminated film of any of [1] to [14] is laminated on a metal member.

Advantageous Effects of Invention

The laminated film of the present invention is excellent in stress whitening resistance, weather resistance, flexibility, transparency, and chemical resistance. When the laminated film of the present invention is used, it is possible to produce a laminated molded article having high design properties in which even when the laminated film of the present invention is bonded to a substrate and subjected to bending processing, problems such as cracking, peeling, and whitening do not occur.

DESCRIPTION OF EMBODIMENTS

Preferred modes of a laminated film and a method for producing the same according to the present invention will be described below. In the present invention, a film is a flat plate material having a thickness of about 0.01 to 0.5 mm and also includes one referred to as a sheet-like material.

<Laminated Film>

The laminated film of the present invention comprises a layer comprising a fluorine-based resin (X) and a layer comprising an acrylic resin composition (Y).

The layer comprising the fluorine-based resin (X) and the layer comprising the acrylic resin composition (Y) may be described as "the (X) layer" and "the (Y) layer" respectively below.

The laminated film can have a two-layer configuration comprising the (X) layer and the (Y) layer, or a three-layer configuration in which the (X) layers are present on both sides of the (Y) layer.

The laminated film preferably has an (X) layer/(Y) layer thickness ratio of 5 to 50/50 to 95 from the viewpoint of solvent resistance and transparency. The laminated film more preferably has an (X) layer/(Y) layer thickness ratio of 5 to 30/70 to 95, further preferably 5 to 15/75 to 95, from the viewpoint of cost.

The thickness of the laminated film is not particularly limited but is preferably 500 μm or less (for example, 10 to 500 μm). In the case of a film used for a laminated molded article, its thickness is preferably 30 to 400 μm. When this thickness is 30 μm or more, handling during molding is easy. On the other hand, when the thickness is 400 μm or less, the laminated film has moderate rigidity, and therefore the lamination properties, the secondary processability, and the like improve. In addition, the laminated film is economically advantageous in terms of mass per unit area. Further, the film-forming properties are stable, and the production of the film is easy. The thickness of the laminated film is more preferably 30 to 200 μm.

In the present invention, the thickness of each layer is calculated by cutting the laminated film to a thickness of 70 nm in the cross-sectional direction to form a sample, observing the sample by a transmission electron microscope, measuring thicknesses at five places, and averaging them. Examples of commercial products of the transmission electron microscope include J100S (trade name) manufactured by JEOL Ltd.

<Fluorine-Based Resin (X)>

The fluorine-based resin (X) of the present invention is a vinylidene fluoride-based resin (F).

The vinylidene fluoride-based resin (F) should be a resin comprising a vinylidene fluoride unit, and a homopolymer comprising only a vinylidene fluoride unit (polyvinylidene fluoride), and a copolymer comprising a vinylidene fluoride unit can be used.

One vinylidene fluoride-based resin (F) may be used alone, or two or more vinylidene fluoride-based resins (F) may be used in combination.

The vinylidene fluoride-based resin (F) may be described as "the resin (F)" below.

The mass average molecular weight (Mw) of the resin (F) is preferably 100000 or more in terms of chemical resistance and preferably 300000 or less in terms of film-forming properties.

The content of the vinylidene fluoride unit in the above copolymer is preferably 85% by mass or more in terms of the compatibility between the resin (F) and an acrylic resin (A) described later.

When the resin (F) is a copolymer, examples of the copolymerization component to be copolymerized with vinylidene fluoride include hexafluoropropylene and tetrafluoroethylene. One of these may be used alone, or two or more of these may be used in combination.

However, in terms of obtaining a laminated film excellent in transparency and heat resistance, the resin (F) is preferably polyvinylidene fluoride.

The resin (F) preferably has a high crystalline melting point. Specifically, the crystalline melting point is preferably 150° C. or more, more preferably 160° C. or more, in terms of heat resistance. The upper limit of the crystalline melting point is preferably about 175° C. equal to the crystalline melting point of polyvinylidene fluoride in terms of heat resistance.

The "crystalline melting point" means "melting peak temperature" measured in accordance with the method described in JIS K7121, 3. (2).

Examples of commercial products of the resin (F) include Kynar 720 (content of vinylidene fluoride: 100% by mass, crystalline melting point: 169° C.) and Kynar 710 (content of vinylidene fluoride: 100% by mass, crystalline melting point: 169° C.) manufactured by ARKEMA K.K.; KFT #850 (content of vinylidene fluoride: 100% by mass, crystalline melting point: 173° C.) manufactured by KUREHA CORPORATION; and Solef 1006 (content of vinylidene fluoride: 100% by mass, crystalline melting point: 174° C.) and Solef 1008 (content of vinylidene fluoride: 100% by mass, crystalline melting point: 174° C.) manufactured by Solvay Specialty Polymers.

In the resin (F), the monomer bond forms include three bond forms: a head-to-head bond, a tail-to-tail bond, and a head-to-tail bond, and the head-to-head bond and the tail-to-tail bond are referred to as "heterobonds".

In terms of improving the chemical resistance of the laminated film, "the ratio of heterobonds" in the resin (F) is preferably 10% by mass or less. In terms of decreasing the ratio of heterobonds, the resin (F) is preferably a resin produced by suspension polymerization.

"The ratio of heterobonds" can be obtained from diffraction peaks in the $^{19}$F-NMR spectrum of the resin (F). Specifically, 40 mg of the resin (F) is dissolved in 0.8 ml of deuterium dimethylformamide ($D_7$-DMF), and $^{19}$F-NMR is measured at room temperature. The obtained $^{19}$F-NMR spectrum has five main peaks at the positions of −91.5 ppm, −92.0 ppm, −94.7 ppm, −113.5 ppm, and −115.9 ppm.

Among these peaks, the peaks at −113.5 ppm and −115.9 ppm are identified as peaks derived from heterobonds. Therefore, the ratio of heterobonds is calculated by the following formula with the total of the peak areas of the five peaks being $S_T$, the area at −113.5 ppm being $S_1$, and the area at −115.9 ppm being $S_2$.

$$\text{ratio of heterobonds} = [\{(S_1 + S_2)/2\}/S_T] \times 100(\%).$$

The resin (F) can comprise a matting agent to the extent that the transparency of the laminated film is not impaired. As the matting agent, organic and inorganic matting agents can be used.

<Layer Comprising Fluorine-Based Resin (X)>

The layer comprising the fluorine-based resin (X) according to the present invention comprises the vinylidene fluoride-based resin (F) alone or a polymer blend of the vinylidene fluoride-based resin (F) and the acrylic resin (A).

One acrylic resin (A) may be used alone, or two or more acrylic resins (A) may be used in combination.

In terms of chemical resistance, the layer comprising the fluorine-based resin (X) comprising the polymer blend preferably contains 50 to 95% by mass of the resin (F) and 5 to 50% by mass of the acrylic resin (A). When the resin (F) is 50% by mass or more, the chemical resistance of the laminated film is good. When the resin (F) is 95% by mass or less, the cost of the laminated film is reduced. The resin (F)/acrylic resin (A) is more preferably 55 to 95/5 to 45% by mass, further preferably 60 to 95/5 to 40% by mass.

The ratio of the resin (F) to the acrylic resin (A) can be measured by gas chromatograph mass spectrometry.

Blending agents described later can be added to this polymer blend.

<Acrylic Resin (A)>

The acrylic resin (A) of the present invention is a polymer comprising an acrylic monomer unit as a main component.

The acrylic resin (A) preferably has a glass transition temperature (Tg) of 95 to 120° C., more preferably 95 to 115° C. When Tg is 95° C. or more, the surface hardness of the laminated film is good. When Tg is 120° C. or less, the moldability of the laminated film is good.

Here, Tg can be measured by a DSC (differential scanning calorimeter).

The "glass transition temperature" is a temperature measured as "extrapolated glass transition start temperature" when the temperature is increased under the condition of a temperature increase rate of 10° C./min in accordance with the method described in JIS K7121, 3. (2).

The acrylic resin (A) may be described as "the resin (A)" below.

The resin (A) is a polymer obtained from an alkyl (meth)acrylate and preferably a polymer comprising 70% by mass or more of an alkyl methacrylate unit.

The content of the alkyl methacrylate unit in the resin (A) is more preferably 80% by mass or more in terms of the surface hardness and heat resistance of the laminated film and preferably 99% by mass or less in terms of the thermal decomposition resistance of the laminated film. The content is further preferably 85% by mass or more and 99% by mass or less.

In terms of the compatibility between the resin (A) and the resin (F), the total content of the alkyl methacrylate unit and the alkyl acrylate unit in the resin (A) is preferably 80% by mass or more.

As a monomer that is a raw material of the resin (A), an alkyl methacrylate whose homopolymer has a Tg of 95° C. or more is preferably used in terms of obtaining a laminated film having high surface hardness.

Examples of the alkyl methacrylate meeting this requirement include methyl methacrylate, t-butyl methacrylate, t-butylcyclohexyl methacrylate, and isobornyl methacrylate. One of these may be used alone, or two or more of these may be used in combination.

The alkyl group of the alkyl methacrylate may be branched or linear. The number of carbon atoms of the alkyl group of the alkyl methacrylate is preferably 4 or less in terms of the heat resistance of the laminated film.

The resin (A) may be a polymer obtained from an alkyl methacrylate or a polymer obtained from an alkyl methacrylate and another monomer (for example, methacrylic acid or styrene).

The Mw of the resin (A) is preferably 30000 or more in terms of the mechanical characteristics of the laminated film and preferably 200000 or less in terms of the moldability of the laminated film. The Mw of the resin (A) is more preferably 50000 or more and 150000 or less, further preferably 70000 or more and 150000 or less.

The resin (A) may comprise a rubber-containing polymer (B) described later to the extent that the transparency of the laminated film is not impaired.

<Layer Comprising Acrylic Resin Composition (Y)>

The acrylic resin composition (Y) means a resin composition comprising a (co)polymer containing an alkyl (meth) acrylate unit.

The acrylic resin composition (Y) preferably contains the following rubber-containing polymer (B), and preferably comprises 80% by mass or more of the rubber-containing polymer (B) from the viewpoint of stress whitening resistance. The acrylic resin composition (Y) more preferably comprises 90% by mass or more, further preferably 95% by mass or more, of the rubber-containing polymer (B) from the viewpoint of mechanical strength.

The acrylic resin composition (Y) may comprise the acrylic resin (A) to the extent that the mechanical strength of the laminated film is not impaired. From the viewpoint of the mechanical strength of the laminated film, the acrylic resin composition (Y) preferably comprises 0 to 20% by mass of the acrylic resin (A). In terms of stress whitening resistance, the acrylic resin composition (Y) preferably comprises 0 to 10% by mass, more preferably 0 to 5% by mass, of the acrylic resin (A).

<Rubber-Containing Polymer (B)>

The rubber-containing polymer (B) of the present invention is obtained by polymerizing a monomer (b) comprising an alkyl methacrylate (b1) having an alkyl group having 1 to 4 carbon atoms in the presence of an elastic polymer (B1) obtained by polymerizing a monomer (a) comprising one or more monomers selected from an alkyl acrylate (a1) having an alkyl group having 1 to 8 carbon atoms and an alkyl methacrylate (a2) having an alkyl group having 1 to 4 carbon atoms, and a crosslinkable monomer (a4).

In the alkyl acrylate (a1) having an alkyl group having 1 to 8 carbon atoms, the alkyl group may be either linear or branched. Specific examples include methyl acrylate, ethyl acrylate, propyl acrylate, butyl acrylate, 2-ethylhexyl acrylate, and n-octyl acrylate. One of these may be used alone, or two or more of these may be used in combination.

Among these, alkyl acrylates having low Tg are preferred, and n-butyl acrylate is more preferred. When Tg is low, the elastic polymer (B1) has good flexibility, and molding can be easily performed.

In the alkyl methacrylate (a2) having an alkyl group having 1 to 4 carbon atoms, the alkyl group may be either linear or branched. Specific examples include methyl methacrylate, ethyl methacrylate, propyl methacrylate, and butyl methacrylate. One of these may be used alone, or two or more of these may be used in combination.

Only either one of the alkyl acrylate (a1) and the alkyl methacrylate (a2) may be used, or both may be used in combination. The ratio of the alkyl acrylate (a1) in 100% by mass of the monomer (a) used as the raw material of the elastic polymer (B1) is preferably 35% by mass or more because the flexibility of the obtained laminated film is good. The ratio is preferably 45% by mass or more, more preferably 60% by mass or more, from the viewpoint of the flexibility of the laminated film.

As the monomer (a) used as the raw material of the elastic polymer (B1), another vinyl monomer (a3) other than the alkyl acrylate (a1) and the alkyl methacrylate (a2) can also be used together.

Examples of the another vinyl monomer (a3) include acrylate monomers such as alkyl acrylates having an alkyl group having 9 or more carbon atoms, alkoxy acrylates, and cyanoethyl acrylate; acrylamide, acrylic acid, methacrylic acid, styrene, alkyl-substituted styrenes, acrylonitrile, and methacrylonitrile.

The crosslinkable monomer (a4) is a component that forms a crosslinked structure with the alkyl acrylate (a1) and/or the alkyl methacrylate (a2) to provide rubber elasticity to the polymer and forms crosslinking between the elastic polymer (B1) and a hard polymer (B2). Especially, a graft crossing agent further having the function of causing graft crossing is preferred.

Examples of the one having such a function include copolymerizable allyl, methallyl, or crotyl esters of α,β-unsaturated carboxylic acids or dicarboxylic acids. Particularly, an allyl ester of acrylic acid, methacrylic acid, maleic acid, or fumaric acid is preferred.

Especially, allyl methacrylate achieves an excellent effect. In addition, triallyl cyanurate and triallyl isocyanurate are also effective.

In the graft crossing agent, mainly the conjugated unsaturated bond of the ester reacts much faster than the allyl group, the methallyl group, or the crotyl group and chemically bonds. During this time, a substantially considerable portion of the allyl groups, the methallyl groups, or the crotyl groups act effectively during polymerization for the next layer polymer and provide graft bonds between two adjacent layers.

The crosslinkable monomer (a4) is not limited to a monomer that provides rubber elasticity to the obtained molded body and causes graft crossing as described above, and may be a crosslinkable monomer for heat resistance improvement.

Examples of the crosslinkable monomer include alkylene glycol dimethacrylates such as ethylene glycol dimethacrylate, 1,3-butylene glycol dimethacrylate, 1,4-butylene glycol dimethacrylate, and propylene glycol dimethacrylate; and polyvinyl benzene such as divinylbenzene and trivinyl benzene.

In this manner, for the crosslinkable monomer (a4), diverse compounds can be selected, but in order to preferably exhibit stress whitening resistance, the use of a graft crossing agent such as allyl methacrylate is preferred.

The total amount of the alkyl acrylate (a1) and the alkyl methacrylate (a2) in 100% by mass of the total of the above monomers (a1) to (a4) is preferably 80 to 100% by mass in terms of weather resistance improvement and the like, and the amount of the monomer (a3) in 100% by mass of the total of the above monomers (a1) to (a4) is preferably 0 to 20% by mass. From the viewpoint of stress whitening resistance and the like, the monomer (a1) unit/monomer (a2) unit content ratio is preferably 50/50 to 100/0 (mass ratio). From the viewpoint of stress whitening resistance, the amount of the monomer (a3) is more preferably 0 to 12% by mass.

The amount of the crosslinkable monomer (a4) is preferably 0.4 to 2.0% by mass, more preferably 0.6 to 1.8% by mass, in 100% by mass of the total of the monomers (a1) to (a4). When this amount is 0.4% by mass or more, the crosslinking between the elastic polymer (B1) and the hard polymer (B2) is stable, and sufficient transparency is exhibited. In addition, the rubber elasticity can be more improved, and the impact resistance of the obtained laminated film increases. Conversely, when this amount is 2.0% by mass or less, crosslinking can be moderately controlled, and the flexibility of the obtained laminated film is preferably exhibited.

The elastic polymer (B1) may be obtained by polymerization in two or more stages. In this case, monomer mixtures having different compositions may be polymerized. By polymerization in two or more stages, the control of the particle diameter of the finally obtained rubber-containing polymer (B) is easy.

When the elastic polymer (B1) is obtained, for example, by polymerization in two stages, the first elastic polymer (B1-1) and the second elastic polymer (B1-2) preferably have graft bonds between two layers by a graft crossing agent.

When the elastic polymer (B1) is a graft polymer obtained by polymerization in two or more stages and having graft bonds between two adjacent layers, the control of the particle diameter of the rubber-containing polymer (B) is easy, and the stress whitening resistance of the obtained laminated film can be preferably exhibited.

In the elastic polymer (B1), the content of the graft crossing agent unit in 100% by mass of the elastic polymer (B1) is preferably 1.2% by mass or more. When the content of the graft crossing agent unit is 1.2% by mass or more, the crosslinking between the layers of the first elastic polymer (B1-1) and the second elastic polymer (B1-2) and between the layers of the elastic polymer (B1) and the hard polymer (B2) is stable, and the stress whitening resistance of the laminated film is preferably exhibited.

The elastic polymer (B1) is obtained by a polymerization method such as emulsion polymerization or suspension polymerization. In the case of emulsion polymerization, an emulsifier, a polymerization initiator, and a chain transfer agent can be used.

As the emulsifier, an anionic, cationic, or nonionic surfactant is used, and particularly an anionic surfactant is preferred.

Specific examples of the anionic surfactant include carboxylates such as rosin acid soaps, potassium oleate, sodium stearate, sodium myristate, sodium N-lauroyl sarcosinate, and dipotassium alkenyl succinates; sulfate salts such as sodium lauryl sulfate; sulfonates such as sodium dioctyl sulfosuccinate, sodium dodecylbenzenesulfonate, and sodium alkyl diphenyl ether disulfonates; and phosphate salts such as sodium polyoxyethylene alkyl phenyl ether phosphates.

Examples of the method for preparing an emulsion include a method of charging water with a monomer mixture and then introducing a surfactant, a method of charging water with a surfactant and then introducing a monomer mixture, and a method of charging a monomer mixture with a surfactant and then introducing water. Among these, the method of charging water with a monomer mixture and then introducing a surfactant, and the method of charging water with a surfactant and then introducing a monomer mixture are preferred.

Specific examples of the polymerization initiator include persulfates such as potassium persulfate and sodium persulfate; organic peroxides such as t-butyl hydroperoxide, cumene hydroperoxide, and benzoyl peroxide; azo compounds such as azobisisobutyronitrile; and redox initiators in which these persulfates or organic peroxides and reducing agents are combined.

Among these, redox initiators are preferred, and particularly sulfoxylate-based initiators in which ferrous sulfate, disodium ethylenediaminetetraacetate salt, sodium formaldehyde sulfoxylate, and hydroperoxides are combined are more preferred.

The polymerization initiator can be added to either one or both of the aqueous phase and the monomer phase.

The amount of the polymerization initiator is preferably 0.05 to 1.0 part by mass, more preferably 0.1 to 0.6 parts by mass, based on 100 parts by mass of the total of the monomers (a1) to (a4). When the amount of the polymerization initiator is 0.05 parts by mass or more, a laminated film having good mechanical strength is obtained. When the amount of the polymerization initiator is 1.0 part by mass or less, the fluidity is good, and the moldability when the acrylic resin composition (Y) is melt-extruded and molded is good.

Specific examples of the chain transfer agent include alkyl mercaptans having 2 to 20 carbon atoms, mercapto acids, thiophenol, and carbon tetrachloride. The chain transfer agent is preferably allowed to coexist during polymerization for the hard polymer (B2), and n-octyl mercaptan is preferred.

The polymerization temperature differs depending on the type and amount of the polymerization initiator but is preferably 40 to 120° C., more preferably 60 to 95° C.

Prior to the polymerization for the elastic polymer (B1), a core portion having a Tg of more than 0° C. may be obtained by polymerization. The core portion is preferably 0 to 10% by mass in the rubber-containing polymer (B) in terms of the stability of polymer particle diameter production.

The core portion is preferably obtained by polymerizing the monomer (a) comprising 10 to 50% by mass of the alkyl acrylate (a1) having an alkyl group having 1 to 8 carbon atoms, 20 to 70% by mass of the alkyl methacrylate (a2) having an alkyl group having 1 to 4 carbon atoms, 0 to 10% by mass of the another vinyl monomer (a3), and 0.1 to 10% by mass of the crosslinkable monomer (a4) (the total of (a1) to (a4) is 100% by mass).

The rubber-containing polymer (B) is obtained by polymerizing the monomer (b) comprising the alkyl methacrylate (b1) having an alkyl group having 1 to 4 carbon atoms in the presence of the above-described elastic polymer (B1). The monomer (b) polymerizes to form a hard portion (B2).

Specific examples of the alkyl methacrylate (b1) include the same as the specific examples of the alkyl methacrylate (a2). One of them may be used alone, or two or more of them may be used in combination.

As the monomer (b), another monomer (b2) other than the alkyl methacrylate (b1) can also be used together. Specific examples of the another monomer (b2) include the same as the specific examples of the alkyl acrylate (a1) and the another vinyl monomer (a3). One of them may be used alone, or two or more of them may be used in combination.

The content of the alkyl methacrylate (b1) in 100% by mass of the monomer (b) is preferably 70% by mass or more, more preferably 85% by mass or more. Thus, the Tg of the hard portion (B2) can be moderately increased.

The monomer (b) may be polymerized in two or more stages. In this case, monomer mixtures having different compositions may be polymerized.

In the polymerization reaction of the monomer (b), it is preferred that after the completion of the polymerization reaction for the elastic polymer (B1), the obtained polymerization liquid is used as it is, and the monomer (b) is added to continuously perform polymerization.

Specific examples of the emulsifier, the polymerization initiator, and the chain transfer agent in this polymerization are the same as the specific examples in the polymerization for the elastic polymer (B1).

The amount of the chain transfer agent is preferably 0.1 to 2 parts by mass, more preferably 0.2 to 1 part by mass, based on 100 parts by mass of the monomer (b). When the amount of the chain transfer agent is 0.1 parts by mass or more, the flexibility of the molded body increases. When the amount of the chain transfer agent is 2 parts by mass or less, the mechanical strength of the molded body increases.

The Tg of the elastic polymer (B1) is preferably 0° C. or less, more preferably −30° C. or less. When Tg is 0° C. or less, the obtained laminated film has preferred impact resistance. This Tg is a value measured and calculated as follows using a dynamic viscoelasticity measuring apparatus.

A test piece is molded into a sheet having a width of 6 mm and a thickness of 1 mm. The values of the storage modulus (E') and the loss modulus (E") are measured in a tensile mode under the conditions of an initial chuck-to-chuck distance of 2 cm, a measurement frequency of 0.1 Hz, a measurement temperature range of −90 to 150° C., a temperature increase rate of 2° C./min, and a nitrogen gas flow of 200 mL/min in accordance with ISO 6721-4 using a dynamic viscoelasticity measuring apparatus. The value of tan δ (loss tangent) at each temperature is calculated according to the formula tan δ=E"/E'.

Next, when the value of tan δ is plotted with respect to temperature, two or more peaks appear. The temperature corresponding to the peak appearing at the lowest temperature, among these, is taken as the Tg of the elastic polymer.

The Tg of the hard portion (B2) is preferably 70° C. or more, more preferably 75° C. or more. When the hard portion (B2) has such Tg, the acrylic resin composition (Y) excellent in moldability is obtained, and the heat resistance of the laminated film is high, and the processability in a low temperature environment is good.

The Tg of the hard portion (B2) is the temperature corresponding to the peak appearing at the highest temperature in the same dynamic viscoelasticity measurement as the measurement method for the Tg of the elastic polymer (B1).

After the completion of the polymerization reaction for the elastic polymer (B1) and before the polymerization of the monomer (b), it is also possible to form an intermediate portion (B3) by sequentially polymerizing monomers having compositions in which from the composition of the monomer constituting the elastic polymer (B1), the ratio of the alkyl acrylate (a1) having an alkyl group having 1 to 8 carbon atoms is gradually decreased, and the ratio of the alkyl methacrylate (a2) having an alkyl group having 1 to 4 carbon atoms is gradually increased.

The intermediate portion (B3) preferably comprises as constituents an alkyl acrylate (c1) having an alkyl group having 1 to 8 carbon atoms, an alkyl methacrylate (c2) having an alkyl group having 1 to 4 carbon atoms, another monomer (c3), and a crosslinkable monomer (c4).

Specific examples of the monomers (c1) to (c4) are the same as the specific examples of the monomers (a1) to (a4).

When the total of the monomers (c1) to (c4) is 100% by mass, it is preferred that the monomer (c1) is 10 to 90% by mass, the monomer (c2) is 10 to 90% by mass, the monomer (c3) is 0 to 20% by mass, and the monomer (c4) is 0 to 10% by mass, in terms of the heat resistance and stress whitening resistance of the obtained laminated film. It is more preferred that the monomer (c1) is 20 to 80% by mass, the monomer (c2) is 20 to 80% by mass, the monomer (c3) is 0 to 10% by mass, and the monomer (c4) is 0 to 5% by mass.

The ratio of the intermediate portion (B3) in 100% by mass of the rubber-containing polymer (B) is preferably 0 to 35% by mass in terms of the design properties of the obtained laminated film and more preferably 5 to 15% by mass in terms of stress whitening resistance.

When the intermediate portion (B3) is contained, the elastic polymer (B1)/intermediate portion (B3)/hard portion (B2) ratio is preferably 25 to 45% by mass/5 to 15% by mass/50 to 70% by mass in terms of stress whitening resistance.

The ratio of the elastic polymer (B1) in 100% by mass of the rubber-containing polymer (B) is preferably 30% by mass or more, more preferably 50 to 70% by mass. When the ratio of the elastic polymer (B1) is 30% by mass or more, the mechanical strength and flexibility of the obtained laminated film improve, and cracking, and whitening in bending can be suppressed. In addition, when the laminated film is laminated on a substrate and subjected to bending processing, whitening, peeling, and rupture can be suppressed.

When the ratio of the elastic polymer (B1) is 70% by mass or less, the obtained laminated film is excellent in thickness precision, and the productivity during molding does not decrease.

The ratio of the hard portion (B2) in 100% by mass of the rubber-containing polymer (B) is preferably 70% by mass or less, more preferably 20 to 60% by mass, and further preferably 30 to 50% by mass. When the ratio of the hard portion (B2) is 20% by mass or more, the fluidity during molding improves, and the production of a laminated film having high film thickness precision is easy. When the ratio of the hard portion (B2) is 70% by mass or less, the flexibility of the laminated film increases, and the molding processability improves.

When an emulsion polymerization method is used, the rubber-containing polymer (B) is recovered as a powder from the latex after the completion of the polymerization reaction. Examples of the method for recovering the rubber-containing polymer (B) as a powder include a method of bringing the latex into contact with a coagulant for coagulation or salting out, followed by solid-liquid separation, washing with water about 1 to 100 times by mass the polymer, and dehydration treatment such as filtration to form a wet powder, and further drying this wet powder by a compression dehydrator or a hot air dryer such as a fluidized dryer.

In addition, the latex may be directly dried by a spray drying method. The polymer drying temperature and drying time can be appropriately determined by the type of the polymer.

Specific examples of the coagulant include organic salts such as sodium acetate, calcium acetate, potassium formate, and calcium formate; and inorganic salts such as sodium chloride, potassium chloride, calcium chloride, magnesium chloride, and sodium sulfate. Especially, calcium salts such as calcium acetate and calcium chloride are preferred.

Particularly, in terms of the warm water whitening resistance of the molded body and in terms of decreasing the water content of the recovered powder, calcium acetate is more preferred.

One coagulant may be used alone, or two or more coagulants may be used in combination.

The coagulant is usually used as an aqueous solution. The concentration of the coagulant, preferably an aqueous solution of calcium acetate, is preferably 0.1% by mass or more, more preferred 1% by mass or more, in terms of being able to stably coagulate and recover the acrylic resin composition. The concentration of the aqueous solution of calcium acetate is preferably 20% by mass or less, more preferably 15% by mass or less, in that the amount of the coagulant remaining in the recovered powder is small, and the performance of the laminated film, particularly warm water whitening resistance, coloration properties, and the like, is hardly decreased.

When the concentration of calcium acetate is more than 20% by mass, calcium acetate may precipitate by saturation at 10° C. or less.

Examples of the method for bringing the latex into contact with a coagulant include a method of while stirring an aqueous solution of a coagulant, continuously adding the latex thereto, and continuing stirring for a fixed time, and a method of bringing an aqueous solution of a coagulant and the latex into contact with each other while continuously injecting the aqueous solution of the coagulant and the latex into a container with a stirrer at a fixed ratio, and continuously drawing a mixture comprising a coagulated powder and water from the container.

The amount of the aqueous solution of the coagulant is preferably 10 to 500 parts by mass based on 100 parts by mass of the latex. The temperature of the coagulation step is preferably 30 to 100° C. in terms of the blocking of the obtained coagulated powder.

The Mw of the acetone-soluble portion of the rubber-containing polymer (B) is preferably 25000 to 70000, more preferably 30000 to 65000. When Mw is 25000 or more, the mechanical strength of the obtained laminated film improves, and cracking during molding processing can be suppressed. In addition, rupture and whitening during bending processing can be suppressed.

When Mw is 70000 or less, the obtained laminated film has high flexibility and is excellent in processability. In other words, when the laminated film is bonded to a substrate such as a steel plate and then subjected to bending processing, no whitening occurs in the bent portion, and the appearance of the obtained various members is good.

This Mw is a value measured by gel permeation chromatography (GPC) for the acetone-soluble portion in the rubber-containing polymer (B). Specifically, a value measured by the following method is adopted.

[1] 1 g of the rubber-containing polymer (B) is dissolved in 50 g of acetone, and the solution is refluxed at 70° C. for 4 hours to obtain an acetone-soluble portion.

[2] The obtained extract is centrifuged at 4° C. at 14000 rpm for 30 minutes using CRG SERIES (manufactured by Hitachi, Ltd.).

[3] The acetone-insoluble portion is removed by decantation, and the residue is dried by a vacuum dryer at 50° C. for 24 hours to obtain the acetone-soluble portion. The acetone-soluble portion is subjected to GPC measurement under the following conditions, and Mw is obtained from the calibration curve of standard polystyrene.

Apparatus: "HLC8220" manufactured by Tosoh Corporation

Columns: "TSKgel SuperMultiporeHZ-H" manufactured by Tosoh Corporation (inner diameter 4.6 mm×length 15 cm×two columns, exclusion limit $4 \times 10^7$ (estimated))

Eluent: tetrahydrofuran

Eluent flow rate: 0.35 mL/min

Measurement temperature: 40° C.

Amount of sample injected: 10 μL (sample concentration 0.1%)

The Mw of the acetone-soluble portion of the rubber-containing polymer (B) can be adjusted by appropriately changing the amount of the chain transfer agent during polymerization. The chain transfer agent is preferably allowed to coexist during polymerization for the hard polymer (B2).

The gel content of the acrylic resin composition (Y) is preferably 50 to 70% by mass, more preferably 55 to 70% by mass. When the gel content is 50% by mass or more, the mechanical strength of the obtained laminated film is high, and handling is easy. When the gel content is 70% by mass or less, the fluidity during molding is high, allowing continuous molding.

Here, the gel content of the acrylic resin composition (Y) can be obtained by calculation by the following formula:

$$G=(m/M)\times100(\%)$$

wherein G (%) represents the gel content, M represents a predetermined amount (also referred to as mass before extraction) of the resin composition, and m represents the mass (also referred to as mass after extraction) of the acetone-insoluble portion of the predetermined amount of the resin composition.

The acrylic resin composition (Y) preferably has a melt tension value of 0.03 N or more, more preferably 0.04 N or more. Melt tension is one of indicators for determining molding processability such as calender moldability, extrudability, blow moldability, and foamability, and the improvement of melt tension can be regarded as the improvement of molding processability.

When the melt tension of the acrylic resin composition (Y) is within the above range, the take-up properties are good in melt extrusion or calender molding, and rupture is less likely to occur. In addition, when the acrylic resin composition (Y) is melt-extruded in the form of a film, a decrease in the amount of the acrylic resin composition (Y) discharged deteriorating productivity can be prevented, and further the thickness precision of the film is also good.

This melt tension is a value when the acrylic resin composition (Y) is extruded at a fixed rate (1.57 $cm^3$/min) under the conditions of capillary diameter φ=1 mm, L/D=16, and a temperature of 230° C., and the strand is taken up at a fixed rate (10 m/min).

<Blending Agents>

The laminated film of the present invention may contain blending agents as needed.

Examples of the blending agents include stabilizers, lubricants, plasticizers, impact resistance aids, fillers, antimicrobial agents, fungicides, foaming agents, release agents, antistatic agents, colorants, matting agents, ultraviolet absorbing agents, and thermoplastic polymers.

For example, it is possible to add the blending agents to a latex, a polymerization liquid, and powder the mixture of the blending agents and the polymer. The blending agents may be mixed after the powdering of the latex. When the laminated film is produced by melt extrusion, the blending agents may be supplied, together with a powder obtained by powdering the latex, to a kneader associated with a molding machine. The kneader associated with the molding machine is, for example, a single-screw extruder or a twin-screw extruder.

The acrylic resin composition (Y) of the present invention can also be obtained, for example, by multistage blending in which first, some of the total amount of the rubber-containing polymer (B), and blending agents as needed, are mixed to make a masterbatch, and this masterbatch is further mixed with the remainder of the rubber-containing polymer (B).

When the acrylic resin composition (Y) is melt-extruded, a molded body can also be obtained by first mixing part of the total amount of the rubber-containing polymer (B), and blending agents as needed, supplying the mixture to a single-screw extruder or a twin-screw extruder, melting and kneading the mixture to make masterbatch pellets, mixing these masterbatch pellets and the remainder of the rubber-containing polymer (B), supplying the mixture to a single-screw extruder or a twin-screw extruder again, melting and kneading the mixture, and melt-extruding the mixture.

When the laminated film is laminated on a substrate for the purpose of the protection of the substrate, an ultraviolet absorbing agent is preferably added to the (Y) layer for weather resistance provision. The molecular weight of the ultraviolet absorbing agent is preferably 300 or more, more preferably 400 or more. When an ultraviolet absorbing agent having a molecular weight of 300 or more is used, problems, for example, the adhesion of the resin to a transfer roll and the like in the production of the film causing roll contamination, can be suppressed.

The type of the ultraviolet absorbing agent is not particularly limited, but benzotriazole-based ultraviolet absorbing agents and triazine-based ultraviolet absorbing agents are preferred.

Examples of commercial products of the former include Tinuvin 360 and Tinuvin 234 manufactured by BASF Japan; and ADK STAB LA-31RG manufactured by ADEKA CORPORATION.

Examples of commercial products of the latter include Tinuvin 1577, Tinuvin 1600, and Tinuvin 460 manufactured by BASF Japan; and ADK STAB LA-F70 and ADK STAB LA-46 manufactured by ADEKA CORPORATION.

The amount of the ultraviolet absorbing agent added is preferably 0.1 to 10 parts by mass based on 100 parts by mass of the acrylic resin composition (Y). From the viewpoint of step contamination during film formation, solvent resistance, and weather resistance, the amount of the ultraviolet absorbing agent added is more preferably 0.5 to 5 parts by mass.

A light stabilizer is preferably added to the (Y) layer. As the light stabilizer, particularly radical scavengers such as hindered amine-based light stabilizers are preferred.

Examples of commercial products of such light stabilizers include Chimassorb 944, Chimassorb 2020, and Tinuvin 770 manufactured by BASF Japan; and ADK STAB LA-57 and ADK STAB LA-72 manufactured by ADEKA CORPORATION.

For the amount of the hindered amine-based light stabilizer added, 0.1 to 5 parts by mass of the hindered amine-based light stabilizer is preferably contained based on 100 parts by mass of the acrylic resin composition (Y). From the viewpoint of preventing step contamination during film formation, the amount of the hindered amine-based light stabilizer added is more preferably 0.15 to 3 parts by mass.

Further, an antioxidant is preferably added to the (Y) layer. As the antioxidant, known ones can be used, but particularly hindered phenolic antioxidants are preferred. Examples of commercial products of such antioxidants include Irganox 1076 manufactured by BASF Japan.

For the amount of the antioxidant added, 0.01 to 5 parts by mass of the antioxidant is preferably contained based on 100 parts by mass of the acrylic resin composition (Y). From the viewpoint of the transparency of the laminated film, the amount of the antioxidant added is more preferably 0.05 to 3 parts by mass.

<Method for Producing Laminated Film>

As the method for producing the laminated film of the present invention, a coextrusion method in which the layer comprising the fluorine-based resin (X) and the layer of the acrylic resin composition (Y) are laminated while being simultaneously melt-extruded is preferred in terms of being able to decrease production steps.

Examples of specific methods for laminating a plurality of molten resin layers include (1) a method of laminating molten resin layers before passage through a die, such as a feed block method, (2) a method of laminating molten resin layers in a die, such as a multi-manifold method, and (3) a method of laminating molten resin layers after passage through a die, such as a multi-slot method.

When the layer comprising the fluorine-based resin (X) and the layer of the acrylic resin composition (Y) are laminated while being simultaneously melt-extruded, the (Y) layer is preferably melt-extruded so as to come into contact with a cooling roll in terms of the matting properties of the surface of the (X) layer.

Specifically, the laminated film of the present invention can be produced, for example, by a production method comprising the following steps. Two melt extruders are provided, and their cylinder temperature and die temperature are set at 200 to 250° C. A composition comprising the fluorine-based resin (X) is melted and plasticized in one extruder.

At the same time, the acrylic resin composition (Y) is melted and plasticized in the other extruder. The molten resins extruded from the dies at the tips of both extruders are coextruded onto a cooling roll set at 50 to 100° C.

<Stretching Whitening Resistance of Laminated Film>

In the laminated film of the present invention, when the laminated film obtained by molding to a thickness of 0.05 to 0.1 mm and a width 15 mm is used as a test piece and the test piece is stretched from an initial chuck-to-chuck distance of 25 mm to 35 mm at a temperature of 0° C. under the condition of a tensile rate of 500 mm/min according to ISO 527-3, the difference (ΔW) between the degree of whiteness (W value) of the test piece before and that after stretching is 5 or less. From the viewpoint of stress whitening resistance, ΔW is preferably 3 or less.

Here, the W value is a value measured according to the geometric conditions a of JIS 28722 using a C/2° light source.

When ΔW before and after stretching is 5 or less, a bent portion does not whiten or whitening is not conspicuous when the film is subjected to bending processing, and therefore the appearance of the obtained laminated film is good.

<Transparency of Laminated Film>

The total light transmittance of the laminated film of the present invention is measured according to JIS K7136.

The total light transmittance measured under the conditions of a light source of D65 and a temperature 25° C. using a haze meter (trade name: NDH4000 manufactured by Nippon Denshoku Industries Co., Ltd.) is 90% or more. When the total light transmittance is 90% or more, the appearance of the laminated film is good.

<Laminated Molded Article>

By laminating the laminated film of the present invention on a surface of a substrate such as various resin molded articles, wood products, and metal molded articles, a laminate (laminated molded article) having the (X) layer on a surface can be produced.

The substrate can be appropriately selected according to the target laminated molded article. For example, in the case of resin molded articles, thermoplastic resins such as polyvinyl chloride resins, olefin-based resins, ABS resins, and polycarbonate resins can be used.

Examples of the laminated molded article include window frames, front door frames, roof materials, and outer wall building materials such as siding materials in the form of being affixed to a steel plate for the purpose of providing design properties.

When the substrate has a two-dimensional shape and is a heat-sealable material, the substrate and the laminated film can be laminated by a method such as heat lamination.

The laminated film should be laminated on a metal member or the like difficult to heat-seal, by using an adhesive or subjecting one surface of the laminated film to adhesion processing.

Further, bending processing or the like may be performed after lamination, and in the laminated film of the present invention, a decrease in design properties, such as whitening and cracking, can be suppressed.

EXAMPLES

The present invention will be specifically described below by Examples, but the present invention is not limited to these. In the following description, "parts" represents "parts by mass", and "%" represents "% by mass". Abbreviations represent the following:

MMA methyl methacrylate
BA n-butyl acrylate
BDMA 1,3-butylene glycol dimethacrylate
AMA allyl methacrylate
MA methyl acrylate
CHP cumene hydroperoxide
tBH t-butyl hydroperoxide RS610NA sodium mono-n-dodecyloxytetraoxyethylene phosphate (Phosphanol RS-610NA: manufactured by Toho Chemical Industry Co., Ltd.)

nOM n-octyl mercaptan

EDTA disodium ethylenediaminetetraacetate (Production Example 1) Rubber-Containing Polymer (B-1)

195 Parts of deionized water was placed in a polymerization container equipped with a stirrer, a cooling tube, a thermocouple, and a nitrogen introduction tube, and then a premix of 0.2 parts of MMA, 4.5 parts of BA, 0.15 parts of AMA, 0.3 parts of BDMA, 0.025 parts of CHP, and 1.1 parts of RS610NA was introduced, and the temperature was increased to 75° C. After the temperature increase, a mixture comprising 5 parts of deionized water, 0.20 parts of sodium formaldehyde sulfoxylate, 0.0001 parts of ferrous sulfate, and 0.0003 parts of EDTA was introduced into the polymerization container at a time to start polymerization. After a temperature increase peak was confirmed, the reaction was continued for 15 minutes to complete polymerization for a first elastic polymer (B1-1).

Next, 1.0 part of MMA, 22.3 parts of BA, 0.74 parts of AMA, 1.5 parts of BDMA, and 0.016 parts of CHP were dropped into the polymerization container over 90 minutes. Then, the reaction was continued for 60 minutes to complete polymerization for a second elastic polymer (B1-2).

The Tg of the first elastic polymer (B1-1) alone and the Tg of the second elastic polymer (B1-2) alone were both −50.2° C.

Next, 5.9 parts of MMA, 4.0 parts of BA, 0.074 parts of AMA, and 0.0125 parts of CHP were dropped into the polymerization container over 45 minutes. Then, the reaction was continued for 60 minutes to complete polymerization for an intermediate polymer (B3). The Tg of the intermediate polymer (B3) alone was 19.8° C.

Finally, 54.7 parts of MMA, 4.8 parts of BA, 0.075 parts of tBH, and 0.24 parts of nOM were dropped into the polymerization container over 140 minutes. Then, the reaction was maintained for 30 minutes to obtain a latex-like rubber-containing polymer (B-1).

The Tg of a hard polymer (B2) alone was 79.3° C. The solid content of the latex-like rubber-containing polymer (B-1) measured after the polymerization was 33%, and the average particle diameter was 0.12 μm.

100 Parts of the obtained latex-like rubber-containing polymer (B-1) was filtered through a vibrating filtration apparatus to which a mesh made of SUS having an opening of 62 μm was attached. Next, the filtrate was dropped into 100 parts of hot water at 80° C. comprising 2.5 parts of calcium acetate to coagulate the latex. Further, the temperature was increased to 95° C. and held for 5 minutes for solidification. The obtained coagulate was separated and washed, and dried at 75° C. for 24 hours to obtain a powdery rubber-containing polymer (B-1). The gel content and Mw of this rubber-containing polymer (B-1) were 65% and 53,000 respectively.

(Production Example 2) Rubber-Containing Polymer (B-2)

A rubber-containing polymer (B-2) was obtained according to amounts added described in "Table 1" in the same manner as Production Example 1 except that the intermediate polymer (B3) was not formed. The gel content and Mw of this rubber-containing polymer (B-2) were 65% and 36,000 respectively.

(Production Example 3) Rubber-Containing Polymer (B-3)

A rubber-containing polymer (B-3) was obtained in the same manner as Production Example 1 according to amounts added described in "Table 1". The gel content and Mw of this rubber-containing polymer (B-3) were 62% and 60,000 respectively.

(Production Example 4) Acrylic Resin Composition (Y-1)

100 Parts of the above rubber-containing polymer (B-1), 2.0 parts of a processing aid (trade name: METABLEN P551A manufactured by MITSUBISHI RAYON CO., LTD.), 2.36 parts of an ultraviolet absorbing agent (trade name: ADK STAB LA-31 manufactured by ADEKA), 0.51 parts of a light stabilizer (trade name: Chimassorb 2020 manufactured by BASF Japan), and 0.1 parts of a phenolic antioxidant (trade name: Irganox 1076 manufactured by BASF Japan) were mixed using a Henschel mixer.

This powdery mixture was melted and kneaded at a cylinder temperature of 100 to 240° C. and a die temperature of 240° C. using a degassing extruder (trade name: TEM-35 manufactured by TOSHIBA MACHINE CO., LTD., the same applies below), to obtain pellets of an acrylic resin composition (Y-1).

(Production Example 5) Acrylic Resin Compositions (Y-2) and (Y-3)

Pellets of acrylic resin compositions (Y-2) and (Y-3) were obtained in the same manner as Production Example 4 according to amounts added described in "Table 2".

(Production Example 6) Polymer Blend (1)

90 Parts of trade name: KF Polymer T #850 (ratio of heterobonds 8.5%) manufactured by KUREHA CORPORATION, as a vinylidene fluoride-based resin (F), 10 parts of an MMA/MA copolymer (MMA/MA=99/1 (mass ratio), Mw: 100000, Tg: 105° C.) as an acrylic resin (A), and 0.1 parts of trade name: ADK STAB AO-60 manufactured by ADEKA, as an antioxidant, were mixed using a Henschel mixer.

The obtained mixture was melted and kneaded at a cylinder temperature of 100 to 240° C. and a die temperature of 240° C. using a degassing extruder, to obtain pellets of a polymer blend (1).

(Production Example 7) Polymer Blend (2)

Pellets of a polymer blend (2) were obtained in the same manner as Production Example 6 except that KF Polymer T #850 was 85 parts, and the MMA/MA copolymer was 15 parts.

(Production Example 8) Polymer Blend (3)

Pellets of a polymer blend (3) were obtained in the same manner as Production Example 6 except that KF Polymer T #850 was 68 parts, and the MMA/MA copolymer was 32 parts.

(Production Example 9) Polymer Blend (4)

Pellets of a polymer blend (4) were obtained in the same manner as Production Example 6 except that KF Polymer T #850 was 100 parts, and the MMA/MA copolymer and AO-60 were not blended.

(Production Example 10) Polymer Blend (5)

Pellets of a polymer blend (5) were obtained in the same manner as Production Example 9 except that Kynar 720 manufactured by ARKEMA K.K. was used as the vinylidene fluoride-based resin (F).
<Evaluation Methods>
(1) Difference Between Degree of Whiteness Before and that after Stretching When a laminated film obtained by molding to a thickness of 0.05 to 0.1 mm and a width 15 mm was used as a test piece and the test piece was stretched by 10 mm from an initial chuck-to-chuck distance of 25 mm to 35 mm at a temperature of 0° C. under the condition of a tensile rate of 500 mm/min according to ISO 527-3, the difference ($\Delta W$) between the degree of whiteness (W value) of the test piece before and that after stretching was measured.

The W value was measured by a color difference meter (trade name: SE-2000 manufactured by Nippon Denshoku Industries Co., Ltd.) according to the geometric conditions a of JIS 28722 using a C/2° light source.

The test piece was taken in the MD direction.
(2) Total Light Transmittance

The total light transmittance of a laminated film was measured according to JIS K7136. The total light transmittance was measured under the conditions of a light source of D65 and a temperature 25° C. using a haze meter (manufactured by Nippon Denshoku Industries Co., Ltd. trade name: NDH4000).
(3) Bending Whitening A laminated film was hot-pressed on a steel plate decorative sheet in which a polyvinyl chloride layer having a thickness 0.1 to 0.3 mm was laminated on a steel plate having a thickness of 0.5 to 1.0 mm at 140° C. to obtained a laminated molded article.

The temperature of the obtained laminated molded article was controlled at −30° C., and then the laminated molded article was bent at 90° over 2 seconds with the steel plate side inside, and a change in the appearance of the laminated molded article was visually evaluated according to the following criteria:

○: The bending fulcrum portion is not whitened.
Δ: The bending fulcrum portion is slightly whitened.
x: The bending fulcrum portion is whitened.
(4) Chemical Resistance Absorbent cotton was impregnated with methyl ethyl ketone (MEK) or ethyl acetate and moved back and forth 20 times on the (X) layer of a laminated film, and then a change in the appearance of the laminated film was visually evaluated according to the following criteria:

○: There is no change in appearance.
x: There is a change in appearance (swelling or white turbidity).

Example 1

A multi-manifold die was mounted at the tips of a 40 mm φ single-screw extruder 1 and a 30 mm φ single-screw extruder 2.

The pellets of the acrylic resin composition (Y-1) obtained in Production Example 4 were supplied to the single-screw extruder 1 having a cylinder temperature of 230 to 240° C., and melted and plasticized. The pellets of the polymer blend (4) obtained in Production Example 9 were supplied to the single-screw extruder 2 having a cylinder temperature of 200 to 230° C., and melted and plasticized.

These melted and plasticized materials were supplied to the multi-manifold die heated to 250° C., to obtain a laminated film of two layers in which the thickness of an (X) layer was 5.0 μm, and the thickness of a (Y) layer was 45.0 μm.

At this time, the temperature of a cooling roll was set at 90° C., and the laminated film was obtained in such a manner that the (Y) layer came into contact with the cooling roll. The evaluation results of the obtained laminated film are shown in "Table 2".

Example 2

A laminated film was obtained in the same manner as Example 1 except that the pellets of the polymer blend (4) were changed to the pellets of the polymer blend (1) obtained in Production Example 6. The evaluation results are shown in "Table 2".

Example 3

A laminated film was obtained in the same manner as Example 1 except that the pellets of the polymer blend (4) were changed to the pellets of the polymer blend (2) obtained in Production Example 7. The evaluation results are shown in "Table 2".

Example 4

A laminated film was obtained in the same manner as Example 1 except that the pellets of the polymer blend (4) were changed to the pellets of the polymer blend (3) obtained in Production Example 8. The evaluation results are shown in "Table 2".

Example 5

A laminated film was obtained in the same manner as Example 1 except that the pellets of the acrylic resin composition (Y-1) were changed to the pellets of the acrylic resin composition (Y-2) obtained in Production Example 5. The evaluation results are shown in "Table 2".

Example 6

A laminated film was obtained in the same manner as Example 1 except that the pellets of the polymer blend (4) were changed to the pellets of the polymer blend (5) obtained in Production Example 10. The evaluation results are shown in "Table 2".

Comparative Example 1

A laminated film was obtained in the same manner as Example 6 except that the pellets of the acrylic resin composition (Y-1) were changed to the pellets of the acrylic resin composition (Y-3) obtained in Production Example 5. The evaluation results are shown in "Table 2".

Comparative Example 2

A laminated film was obtained in the same manner as Example 2 except that the pellets of the acrylic resin composition (Y-1) were changed to the pellets of the acrylic resin composition (Y-3) obtained in Production Example 5. The evaluation results are shown in "Table 2".

Comparative Example 3

A laminated film was obtained in the same manner as Example 3 except that the pellets of the acrylic resin composition (Y-1) were changed to the pellets of the acrylic resin composition (Y-3) obtained in Production Example 5. The evaluation results are shown in "Table 2".

TABLE 1

| Rubber-containing polymer (B) | | (B-1) | (B-2) | (B-3) |
|---|---|---|---|---|
| First elastic polymer (B1-1) [parts] | MMA | 0.2 | 0.3 | 0.3 |
| | BA | 4.5 | 4.7 | 4.5 |
| | BDMA | 0.3 | 0 | 0.2 |
| | AMA | 0.15 | 0.08 | 0.05 |
| Second elastic polymer (B1-2) [parts] | MMA | 1.0 | 3.0 | 1.5 |
| | BA | 22.3 | 46.6 | 22.4 |
| | BDMA | 1.5 | 0 | 1.0 |
| | AMA | 0.74 | 0.79 | 0.25 |
| Content of graft crossing agent unit in (B1-1) + (B1-2) [%] | | 2.91 | 1.57 | 0.99 |
| Intermediate polymer (B3) [parts] | MMA | 5.9 | 0 | 6.0 |
| | BA | 4.0 | 0 | 4.0 |
| | AMA | 0.074 | 0 | 0.075 |
| Hard polymer (B2) [parts] | MMA | 54.7 | 40.1 | 55.0 |
| | BA | 4.8 | 4.5 | 4.8 |

From the above Examples and Comparative Examples, the following became clear.

In the laminated film of the present invention, the difference between the degree of whiteness (ΔW) before and that after stretching is 5 or less, and the stress whitening resistance is excellent. In addition, even when the laminated film of the present invention is laminated on a steel plate decorative sheet, and a bending whitening test is carried out, whitening does not occur, and therefore the molding processability is excellent.

Therefore, it is possible to produce a laminated molded article having high design properties in which even when the laminated film of the present invention is bonded to a substrate made of a metal or the like, and this substrate is subjected to bending processing in order to form the substrate into the shapes of various members such as a front door, problems such as cracking, peeling, and whitening do not occur.

INDUSTRIAL APPLICABILITY

The laminated film of the present invention is excellent in transparency, stress whitening resistance, and chemical resistance. The laminated film of the present invention is particularly suitable for laminated molded articles for building materials and laminated molded articles for vehicle members.

The invention claimed is:

1. A laminated film comprising
   a layer comprising a fluorine-based resin (X) and
   a layer comprising an acrylic resin composition (Y),
      wherein the acrylic resin composition (Y) comprises a rubber-containing polymer (B),
      wherein the rubber-containing polymer (B) is a graft polymer and comprises 30% by mass or more of an elastic polymer (B1) in 100% by mass of the rubber-containing polymer (B), and
      wherein a content of a graft crossing agent unit in 100% by mass of the elastic polymer (B1) is 1.2% by mass or more,
      wherein when a test piece is stretched from a chuck-to-chuck distance of 25 mm to 35 mm at a temperature of 0° C. and a tensile rate of 500 mm/min according to ISO 527-3, a difference (ΔW) between a degree of whiteness of the test piece before and that after stretching is 5 or less.

2. The laminated film according to claim 1, wherein the fluorine-based resin (X) is a vinylidene fluoride-based resin (F).

3. The laminated film according to claim 1, wherein the layer comprising the fluorine-based resin (X) comprises a polymer blend of a vinylidene fluoride-based resin (F) and an acrylic resin (A).

TABLE 2

| | | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| (X) layer [parts] | Vinylidene fluoride-based resin (F) | KF Polymer T#850 | 100 | 90 | 85 | 68 | 100 | 0 | 0 | 90 | 85 |
| | | Kynar 720 | 0 | 0 | 0 | 0 | 0 | 100 | 100 | 0 | 0 |
| | Acrylic resin (A) | MMA/MA copolymer | 0 | 10 | 15 | 32 | 0 | 0 | 0 | 10 | 15 |
| | Antioxidant | AO-60 | 0 | 0.1 | 0.1 | 0.1 | 0 | 0 | 0 | 0.1 | 0.1 |
| (Y) layer [parts] | Rubber-containing polymer (B-1) | | 100 | 100 | 100 | 100 | 0 | 100 | 0 | 0 | 0 |
| | Rubber-containing polymer (B-2) | | 0 | 0 | 0 | 0 | 100 | 0 | 0 | 0 | 0 |
| | Rubber-containing polymer (B-3) | | 0 | 0 | 0 | 0 | 0 | 0 | 100 | 100 | 100 |
| | Processing aid | P551A | 2 | 2 | 2 | 2 | 2 | 2 | 2 | 2 | 2 |
| | Ultraviolet absorbing agent | LA-31 | 2.36 | 2.36 | 2.36 | 2.36 | 0 | 2.36 | 2.1 | 2.1 | 2.1 |
| | | Tinuvin 234 | 0 | 0 | 0 | 0 | 1.4 | 0 | 0 | 0 | 0 |
| | Light stabilizer | Chimassorb 2020 | 0.51 | 0.51 | 0.51 | 0.51 | 0.51 | 0.51 | 0 | 0 | 0 |
| | | LA-57 | 0 | 0 | 0 | 0 | 0 | 0 | 0.3 | 0.3 | 0.3 |
| | Antioxidant | Irganox 1076 | 0.1 | 0.1 | 0.1 | 0.1 | 0.1 | 0.1 | 0.1 | 0.1 | 0.1 |
| | ΔW before and after stretching (MD direction) | | 2.6 | 3.1 | 2.0 | 0.7 | 2.8 | 1.8 | 14.4 | 8.7 | 7.0 |
| | Total light transmittance [%] | | 93.0 | 93.2 | 93.0 | 93.0 | 93.4 | 93.1 | 93.1 | 93.2 | 93.0 |
| | Bending whitening | | ○ | ○ | ○ | ○ | ○ | ○ | x | x | x |
| | Chemical resistance | MEK | ○ | ○ | ○ | ○-Δ | ○ | ○ | ○ | ○ | ○ |
| | | Ethyl acetate | ○ | ○ | ○ | ○ | ○ | ○ | ○ | ○ | ○ |

4. The laminated film according to claim 1, wherein the layer comprising the acrylic resin composition (Y) comprises 80% by mass or more of the rubber-containing polymer (B).

5. The laminated film according to claim 3, wherein a glass transition temperature of the acrylic resin (A) is 95 to 120° C., and
a vinylidene fluoride-based resin (F)/acrylic resin (A) content ratio is 50/50 to 95/5 (mass ratio).

6. The laminated film according to claim 1, wherein the rubber-containing polymer (B) is obtained by polymerizing a monomer (b) comprising an alkyl methacrylate (b1) having an alkyl group having 1 to 4 carbon atoms in the presence of the elastic polymer (B1) obtained by polymerizing a monomer (a) comprising one or more monomers selected from an alkyl acrylate (a1) having an alkyl group having 1 to 8 carbon atoms and an alkyl methacrylate (a2) having an alkyl group having 1 to 4 carbon atoms, and a crosslinkable monomer (a4).

7. The laminated film according to claim 6, wherein a total content of an alkyl acrylate (a1) monomer unit and an alkyl methacrylate (a2) monomer unit in the elastic polymer (B1) is 80% by mass or more.

8. The laminated film according to claim 6, wherein an alkyl acrylate (a1) monomer unit/alkyl methacrylate (a2) monomer unit content ratio of the elastic polymer (B1) is 50/50 to 100/0 (mass ratio).

9. The laminated film according to claim 6, wherein the elastic polymer (B1) comprises another vinyl monomer (a3) unit, and a content of the monomer (a3) unit in the elastic polymer (B1) is 12% by mass or less.

10. The laminated film according to claim 6, wherein a content of an alkyl methacrylate (b1) monomer in the monomer (b) is 70% by mass or more.

11. The laminated film according to claim 1, having a total light transmittance of 90% or more.

12. The laminated film according to claim 1, wherein a thickness ratio of the layer comprising the fluorine-based resin (X) to the layer comprising the acrylic resin composition (Y) is 5/95 to 50/50.

13. A laminated molded article wherein the laminated film according to claim 1 is laminated on a substrate.

14. A laminated molded article wherein the laminated film according to claim 1 is laminated on a metal member.

15. The laminated film according to claim 1, wherein the rubber-containing polymer (B) comprises 50% to 70% by mass of the elastic polymer (B1) in 100% by mass of the rubber-containing polymer (B).

16. The laminated film according to claim 1, wherein the elastic polymer is obtained by polymerizing monomers comprising a crosslinkable monomer (a4) selected from the group consisting of: (i) allyl, methallyl or crotyl esters of α,β-unsaturated carboxylic acids or dicarboxylic acids; and (ii) allyl ester of acyclic acid, methacrylic acid, maleic acid, or fumaric acid.

17. The laminated film according to claim 1, wherein the elastic polymer is obtained by polymerizing monomers comprising a crosslinkable monomer (a4) selected from the group consisting of ethylene glycol dimethacrylate, 1,3-butylene glycol dimethacrylate, 1,4-butylene glycol dimethacrylate, and propylene glycol dimethacrylate, divinylbenzene and trivinyl benzene.

18. The laminated film according to claim 6, wherein an amount of the crosslinkable monomer (a4) is 0.4 to 2.0% by mass of the total of the monomers (a1) to (a4).

19. The laminated film according to claim 6, wherein an amount of the crosslinkable monomer (a4) is 0.6 to 1.5% by mass of the total of the monomers (a1) to (a4).

* * * * *